3,203,843
CHARGE MATERIAL
Charles H. Jackson, Redondo Beach, Calif., assignor to Hi-Shear Corporation, Torrance, Calif., a corporation of California
No Drawing. Filed Jan. 24, 1962, Ser. No. 168,555
1 Claim. (Cl. 149—19)

This invention relates to compositions of matter whose purpose is to generate gas upon being ignited.

The problem of providing gas producing materials for devices such as squibs, which materials are readily and reliably ignitable, and which can be depended upon to provide significant quantities of gas is a prevalent one. Devices using such materials are often utilized at critical junctures in systems such as missiles, where the entire reliability of the large system depends on the function of the material. While many gas-producing compositions for such uses are known, the search still continues for mixtures in which the reliability is still higher. It is an object of this invention to provide such a composition.

The compositions according to this invention comprise an initiation material consisting essentially of an intimate mixture of zirconium, potassium perchlorate, graphite, and a fluoroelastomer, and a main charge material which is readily ignitable by the initiation material, consisting essentially of an intimate mixture of titanium hydride, potassium perchlorate, and a fluoroelastomer.

An initiation material according to this invention consists essentially of an intimate mixture of the following: (a) zirconium, obtainable from Metal Hydrides, Inc., Beverly, Massachusetts, grade AZ or equal, having an average particle size of 3 plus or minus 1 micron, percentage by weight, 46.0% plus or minus 0.2% (b) potassium perchlorate, in accordance with Picatinny Arsenal specification PA–PD–254, granulation IV, passed through a #325 U.S. sieve, percentage by weight 48.0% plus or minus 0.2%, (c) graphite, grade UCP2 obtainable from United Carbon Products Company, Bay City, Michigan, passed through a #325 U.S. sieve, percentage by weight 1.0% plus or minus 0.1%, and (d) a fluoroelastomer, such as Viton B obtainable from E. I. du Pont de Nemours and Company, Wilmington, Delaware, percentage by weight 5.0% plus or minus 0.1%.

Prior to using the fluoroelastomer, it should be dissolved in N-butyl acetate, purified or reagent grade, to make a solution containing approximately 20% by weight of the fluoroelastomer.

The following are instructions for preparing a 20 gram batch of the initiation material:

Weigh the wet zirconium which, as obtained from the manufacturer, contains approximately 40% water, to obtain an amount of zirconium approximately equal to the dry weight required. Next wash it thoroughly by adding methanol, reagent grade, allowing it to settle, and then decant the liquid. Repeat this washing operation several times.

Next oven dry the zirconium at 185° F. for two hours minimum. Weigh the dry zirconium, and base the required amounts of the other ingredients on this dry weight.

Next, wet the zirconium with N-butyl acetate and acetone, reagent grade, and place the wet zirconium in a stainless steel cup of approximately two-inch inside diameter containing two ⅝-inch diameter bronze balls. Add the other ingredients.

Add sufficient N-butyl acetate and acetone solution to permit proper blending. Rotate the cup at approximately 36 r.p.m. on an axis canted 45° degrees from the vertical for 3 to 6 hours until the mixture is semi dry and uniformly blended.

Remove the mixture from the blender and force through a #20 U.S. sieve with a rubber policeman.

Oven dry the granulated material at 185° F. for four hours minimum. Place the material in a dessicator for storage.

The material is now in granular form suitable for being compacted into a charge which can readily be ignited by current through such means as a bridge wire. It is particularly suitable for the ignition of the main charge material described below. A main charge material which is especially well adapted to be ignited by the above initiator material consists essentially of the following intimate mixture:

(a) Titanium hydride, grade E or equal, sold by Metal Hydrides, Inc., Beverly, Massachusetts, average particle size 5 microns, percentage by weight 30.0% plus or minus 0.2%, (b) potassium perchlorate in accordance with Picatinny Arsenal specification PA–PD–254, granulation IV. Prior to use, pass the material through a #325 U.S. sieve, and use only the material which passes through the sieve, percentage by weight 65.0% plus or minus 0.2%, and (c) a fluoroelastomer such as Viton B, sold by E. I. du Pont de Nemours, Wilmington, Delaware, percentage by weight, 5.0% plus or minus 0.1%.

Prior to its use, dissolve the fluoroelastomer in N-butyl acetate, purified or reagent grade, to make a solution containing approximately 20% of the fluoroelastomer by weight.

Instructions for the preparation of a 100 gram batch of this main charge material are as follows:

Weigh the dry titanium hydride and place in the pan of a small mulling wheel mixer. Approximately a 5" diameter mixer is preferable for this size batch. Wet the titanium hydride with N-butyl acetate.

Weigh the dry potassium perchlorate and add to the mixer pan. Wet the potassium perchlorate with N-butyl acetate.

Weigh the Viton B solution to obtain the required dry weight of fluoroelastomer and add to the mixer pan. Rinse the fluoroelastomer solution container with N-butyl acetate, and add the rinsings to the mixer pan. Acetone, reagent grade, may be added to the N-butyl acetate if a more volatile solvent is required.

The wheels and blades of the mixer should be adjusted in advance to provide about a $\frac{1}{16}$" clearance from the bottom of the pan. Blend for three to six hours at about 45 r.p.m. until most of the solvent has evaporated. It may be necessary to stop the mixer occasionally and scrape material from the blades and wheels with a rubber policeman to obtain uniform dispersion of the ingredients.

After dispersion is obtained, stop the blender, raise the wheels and blades, transfer the semi-dry material to an aluminum container. Force the material through a #20 U.S. sieve, using a rubber policeman or spatula. Oven dry the granular material at 185° F. for four hours minimum and place the dry granulated material in a desiccator for storage.

This granulated material is now ready for use as a charge, either loosely packed or compacted into a grain. In either form, it is particularly well-adapted reliably to be ignited by the initiation charge, and to carry out its function of producing substantial volumes of gas upon ignition.

The initiator material is ignitable by a glowing bridgewire. The other material is ignitable by ignited initator material.

In both charge materials, the ingredients are supplied in substantially stoichiometric ratio, to provide for optimum results. More or less of the various ingredients could, of course, be used within limits, but the excess would serve no useful purpose.

I claim:

A charge material consisting essentially of an intimate mixture of: (a) titanium hydride 30.0% plus or minus 0.2% by weight, (b) potassium perchlorate 65.0% plus or minus 0.2% by weight, and, (c) a fluoroelastomer 5.0% plus or minus 0.1% by weight.

References Cited by the Examiner

UNITED STATES PATENTS

| | | | |
|---|---|---|---|
| 892,302 | 8/07 | Pierce | 149—83 |
| 930,570 | 8/09 | Strange | 149—42 |
| 1,743,941 | 1/30 | Van Vactor | 149—83 |
| 1,999,820 | 4/35 | Nash | 149—37 X |
| 2,791,111 | 5/57 | Gleim | 149—42 X |
| 2,976,136 | 3/61 | Heiskell | 149—37 |
| 3,027,283 | 3/61 | Bice | 149—42 X |
| 3,030,243 | 4/62 | Hart | 149—42 |
| 3,032,451 | 5/62 | Toulmin | 149—87 X |

CARL D. QUARFORTH, *Primary Examiner.*

LEON D. ROSDOL, *Examiner.*